United States Patent [19]

Rohner

[11] Patent Number: 4,736,800

[45] Date of Patent: Apr. 12, 1988

[54] FOOTWEAR FOR HOOFED ANIMALS

[76] Inventor: Hubert Rohner, Ritterstutz 301, CH-7021 Felsberg, Switzerland

[21] Appl. No.: 893,335

[22] Filed: Aug. 5, 1986

[30] Foreign Application Priority Data

Aug. 9, 1985 [CH] Switzerland ............. 3429/85

[51] Int. Cl.[4] .............................................. A01L 3/00
[52] U.S. Cl. ..................................... 168/18; 168/22; 54/82
[58] Field of Search .......... 168/1, 18, 20, 22; 54/82

[56] References Cited

U.S. PATENT DOCUMENTS

| 105,068 | 7/1870 | Haedrich et al. | 168/18 |
| 200,273 | 2/1878 | Franklin | 54/82 X |
| 519,047 | 5/1894 | Rogers | 54/82 X |
| 708,983 | 9/1902 | Bartlett | 168/1 |
| 4,444,269 | 4/1984 | Laurent | 168/18 X |

FOREIGN PATENT DOCUMENTS

| 9431 | 4/1880 | Fed. Rep. of Germany . |
| 3223187 | 12/1983 | Fed. Rep. of Germany . |
| 3311383 | 10/1984 | Fed. Rep. of Germany . |
| 2216911 | 9/1974 | France . |

Primary Examiner—Robert P. Swiatek
Attorney, Agent, or Firm—Frishauf, Holtz, Goodman & Woodward

[57] ABSTRACT

Footwear (4) for hoofed animals has a hoof-covering part (11) which covers the hoof (1) and is at least partially closed underneath by a sole area (5). This is joined to a fetlock section (16) which extends upward and has holes (26) for fastening by a band (22' or 22"), so that fastening is effected not in the regions of the hoof (1), but in the regions of the fetlocks (2).

21 Claims, 4 Drawing Sheets

FOOTWEAR FOR HOOFED ANIMALS

The invention relates to footwear for hoofed animals according to the preamble of claim 1.

BACKGROUND

Footwear has previously been proposed in a very wide variety of embodiments, especially for solipeds, in general horses. Examples of many known embodiments are given in U.S. Pat. No. 3,578,086 or in U.S. Pat. No. 3,732,929; however none of them have become established to date because, inter alia, they extended only to the height of the hoof or just above, i.e. were in the form of a shoe. The hoof constantly slipped out of the "shoe" because its side walls were too low and/or the heel cap was unable to sit sufficiently firmly. To date, it has not been possible to increase the height of the heel cap because the hoof is relatively high at the front whereas the rudiments of two toes are present at the rear (the hoof is a reinforced middle toe) and are relatively soft and sensitive. Hence, it is also impossible to achieve the objective by means of the previous suggestions of extending the hoof-covering part upward, for example according to German Pat. No. 9431, because the rear of the footwear, or its upper edge, pressed against these soft, sensitive parts and the animal soon went lame.

THE INVENTION

It is therefore the object of the invention to overcome the stated disadvantages of known footwear for hoofed animals and to design this as far as possible so that it is suitable as a substitute for a shoe and may also be suitable for the treatment of sick animals.

Briefly, the footwear includes a unitary cup-shaped element, preferably a plastic injection molded element, which as a sole and a hoof-covering part which is extending upwardly by means of a fetlock section which substantially covers the fetlocks of the animal. Fastening means are carried by the fetlock sections which, in accordance with a feature of the invention, cover only the forward and side part of the leg of the animal; the rear wall of the unit, and starting from the rear edge of the sole, has an upper edge which is positioned below the region of the rudimentary toes of the animal, typically a horse. The fastening means engage the hollow of the heel at the rear of the animal's foot above the rudimentary toes, leaving a space between the upper edge of the rear wall and a lower edge of the fastening means. Typically, the fastening means are bands, tapes or straps.

By terminating the upper edge of the rear wall underneath the rudimentary toes, fastening can be effected in the hollow of the heel which on the one hand is less sensitive and in which, on the other hand, the hoof can be better prevented from accidentally slipping out of the footwear. This makes the footwear tolerable for the animal, so that even sick animals can be provided with it. It is possible, for example for cows suffering from foot and mouth disease, to place a treatment agent on a sponge, a cloth or cotton wool inside the sole, which is preferably closed for this purpose, and thus to ensure continuous action of the agent, while at the same time ensuring that the infection is not transmitted everywhere so easily via an unshielded hoof.

For certain applications, it may be expedient to arrange holes in the sole, preferably between the cleats, through which holes any foreign bodies entering the shoe from above, such as dust, sand, etc., or water, can emerge again below.

Plastic materials are now available which are not only extremely abrasion-resistant but also possess sufficient flexibility to protect the ankles of a horse much better than a horseshoe, even during riding on a hard surface.

No precautions were taken in the case of previous footwear to make them adaptable to different heights and circumferences of the upper edge of the hoof, so that it had been necessary to produce and store different sizes in this respect too (not only with regard to the base area). Depending on the circumference of the fetlocks, the portions extending the fetlock section, can be made more or less narrow with the aid of a slot. In the case of a low hoof, an adjustment can easily be made by providing, underneath the slot, at least one indent line in the material for possible extension of the slot, the indent line expediently being terminating in a hole at the end of the slot. In other words, the slot should be easy to lengthen, care being taken to ensure that tearing is avoided as far as possible. At least the end of such an extension cut should be present in advance, and it is of course possible to provide a complete cutting line. Such cutting lines can be provided in a known manner, in the form of weakening of the material (perforations, thinner walls, inclusion of weaker material) or simply in the form of drawn cutting lines. If the end of the cut is formed by a hole, tearing can be effectively prevented.

The fastening apparatus may be of any form, a very wide variety of devices (buckles, spring closures, bands, belts, etc.) having been disclosed in the shoe industry too. However, it is preferable if the fetlock section has holding means, in particular in the form of openings (in contrast, for example, U.S. Pat. No. 3,732,929 describes hooks), for at least one tensioning element, such as a belt or band, which serves as a fastening means. These openings can be reinforced with rings and, in the preferred case of a belt or band, are expediently elongated in the vertical direction. A flat tension means, such as a belt or band, is more advantageous because the compressive forces are better distributed and there is a tendency to avoid constriction.

Because adaptability to different sizes is desirable, it is advantageous, in such an embodiment of the holding means, if, at least in some places, in particular toward the rear, at least two holding means, preferably openings, are provided, one underneath the other, for optional placement of the tensioning means at various heights. This can be effected if at least two rows of such holding means running around the fetlock section are provided. Simpler and more reliable, however, is an embodiment in which a slot-like opening is provided in front of two or more holding means which are located toward the rear and in the form of openings, via which slotlike opening the tensioning means fed through an opening in the upper region of the fetlock section at the front can be guided downward. This avoids a plurality of openings at the front, which in fact would also result in a certain weakening of the material. The construction is also simplified in this manner.

If the lower holding means is used for a smaller animal, the upper part stands up freely and may be troublesome. It is therefore advantageous if a cut line is present in the material between the openings located one underneath the other and toward the rear, the said cut line passing between the openings and forward to the upper edge of the fetlock section. The design of such cut lines has already been discussed above.

Precisely because of the stated soft and sensitive parts of the hoofed animal the rear wall has a cut-out extending downward from the upper edge of the fetlock section. Preferably one or more cut lines are provided, located to shorten the residual rear wall. Thus, the sensitive parts can remain uncovered, and the rear wall can easily be adjusted to different heights to suit animals of different sizes.

Closer fitting of the fetlock sections despite greater strength of the hoof covering results from the fact that, at least at the front, the wall thickness of the fetlock section is smaller than that of the hoof-covering part, the two wall sections, in particular, possessing a continuous transition from one section to the other, so that troublesome bends in the material are avoided.

In this way, the work of the blacksmith can be replaced by that of the shoemaker and, for reasons of cost, such footwear is most advantageously produced from plastic, for example by injection molding. Those parts which are adjacent to more sensitive areas of the animal may furthermore be cushioned or provided with a foam covering or foam rubber covering, for example also the insides of belts where the latter are used.

DRAWINGS

FIG. 1 shows a section through such footwear, along the lines I—I of FIG. 2 and 3, FIG. 2 shows a plan view, FIG. 3 shows a view from the rear, FIG. 4 shows a front view of the footwear according to FIG. 1 and FIG. 5 shows a section through another embodiment of the description.

DETAILED DESCRIPTION

Figure 1:
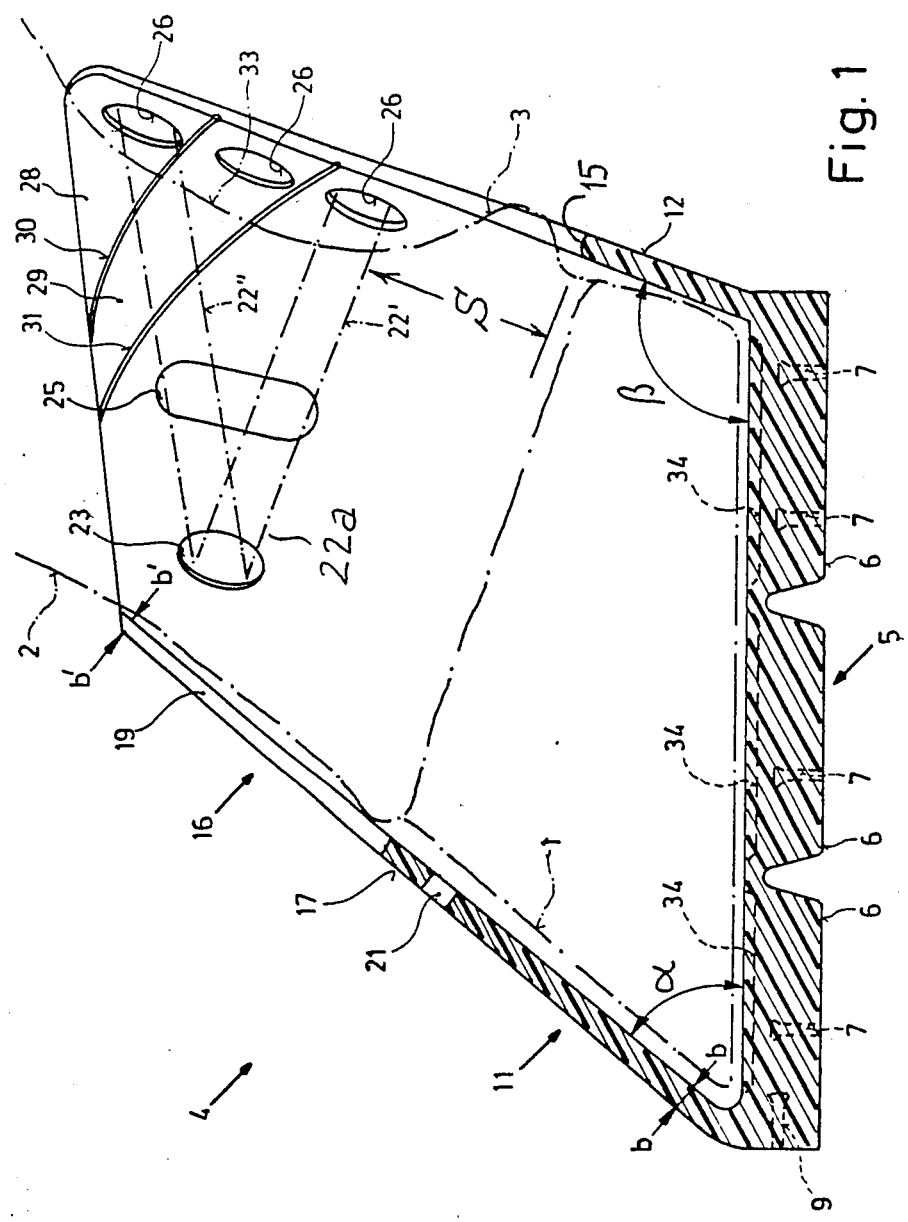

In FIG. 1, a hoof 1 together with the connected fetlock 2 of a soliped, namely a horse, is indicated by a dot-dash line. The hoof 1 is somewhat higher at the front (on the left in FIG. 1), whereas a pair of pressure-sensitive parts 3 project at the rear.

On the basis of these facts, the associated cup-like footwear 4 has a sole area 5, which preferably covers the entire bottom of the hoof 1. This sole area 5 advantageously has cleats 6 which projects in the same manner as in a shoe and are also known from the prior art, but may furthermore are provided with indentations 7 into which metal studs or metal spikes 8 (indicated by dot-dash lines in FIG. 4) can be inserted. Furthermore, the inside of the sole 5 can have shallow depressions (for example in the regions of the cleats 6), into which tampons containing a treatment agent may be inserted for therapeutic purposes, although this can also be done in the absence of such depressions, for example in order to treat foot and mouth disease in cloven-hoofed animals, which can be prevented from spreading by means of the completely closed cup-like form of the footwear 4.

Figure 4:
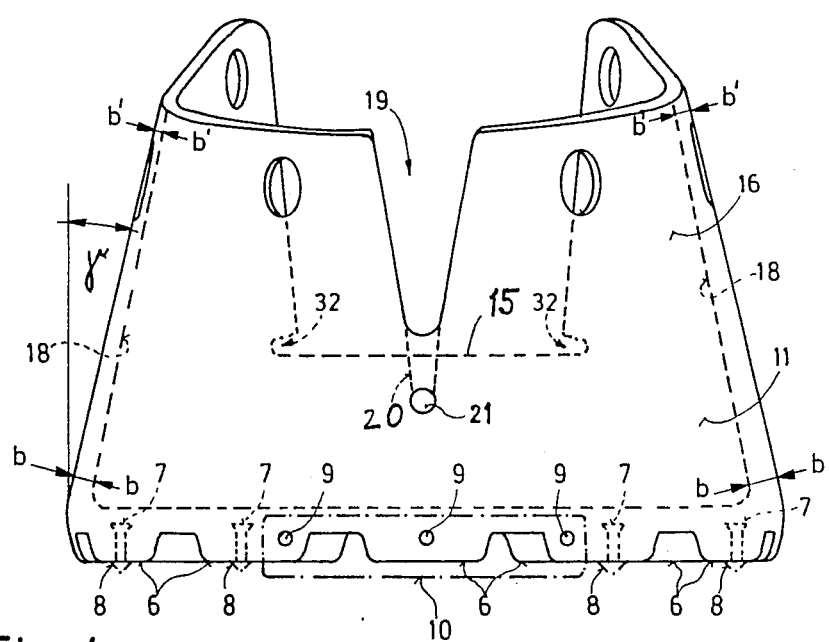

A known posture defect frequently observed in horses is one in which the animal supports a rear hoof on its front edge. To protect the footwear from abrasion and damage which arises in this way, it is advantageous if at least one, if appropriate at least two and in the present case three forward-pointing indentations 9 are provided for insertion of a single forward-pointing covering or an appropriate number of such coverings, depending on the studs or spikes 8 in FIG. 4. In FIG. 4, a covering plate 10 is indicated by a dot-dash line and can have three pins which are insertable into the indentations 9 and is matched to the curve of the front section.

Figure 3:
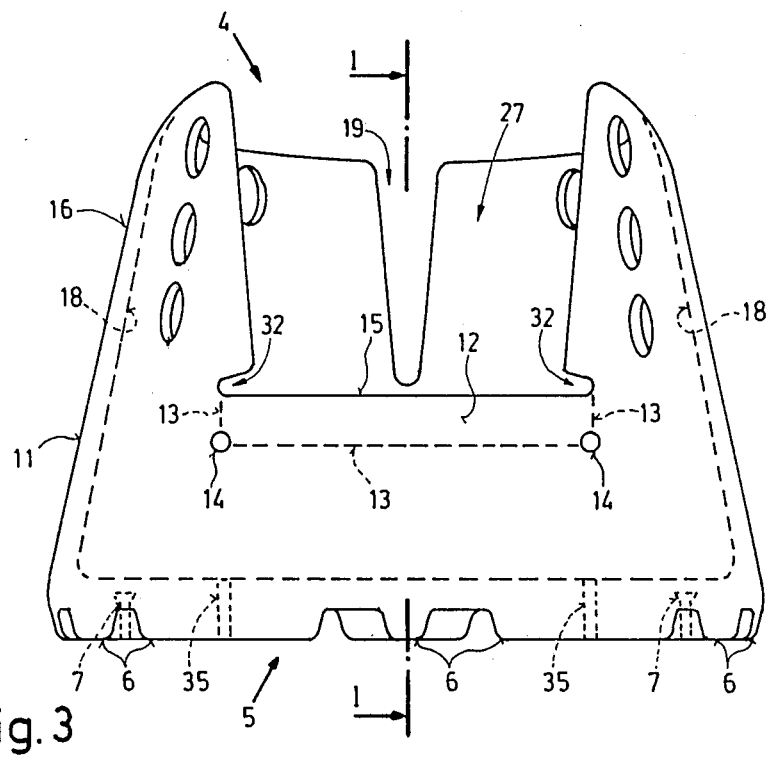

A hoof-covering part 11 which covers the hoof 1 is joined to the sole area 4 in a known manner. This hoof-covering part 11 preferably has a rear wall 12 which leaves the sensitive, rudimentary toes 3 of the animal free. To permit adaptation to different heights of the hoof 1 at the rear, the entire footwear is advantageously produced from a moldable material, such as plastic, and possesses at least at the rear (FIG. 3) preferably at least one indented line 13, which is interrupted by holes 14 defining the corners of this indented line 13. The indented line can, if appropriate, be predetermined by a thinning of the material, as will be demonstrated below in connection with other indented lines. However, other constructions are of course also possible. For example, the inside of the footwear may be lined with textile material, the plastic material between the upper edge 15 and the indented line 13 forming a belt which has already been cut through along the line 13, so that only the lining need be cut open. In a similar manner, the material may be weakened along the line also by means of incorporated weaker material, and it is also possible to provide a tear string along the cutting line 13 in order to permit a simple tear instead of a cut, although this is associated with the risk of irregular edges which may irritate the animal's skin.

The hoof-covering part 4, which to some extent corresponds to a "shoe", is connected to a fetlock section 16 which corresponds to a "bootleg" and at least partially covers the fetlocks 2 (FIG. 1) of the animal. Advantageously, the transition from the hoof-covering part 11 to the fetlock section 16 is made continuous and stepless, so that the front wall 17 of the two parts 11, 16, as well as the side walls 18 (cf. FIG. 3, 4) at least possess continuous transition sections.

The front wall 17 which thus extends over both parts 11 and 16 advantageously forms an angle of at least 45° or more with the plane of the sole area 5 or with a plane parallel to this. This angle alpha is preferably about 50° or more, for example between 50° and 60°. Consequently, most hoof shapes can be fit. On the other hand, it is advantageous for the same reason if the angle beta which the rear wall 12 forms with the plane of the sole area 5 is more than 90°, preferably at least 100° and in particular about 110°.

However, these angles tend toward the vertical at the sides where, according to FIG. 4, an angle gamma results which may advantageously be about 10° to 15°, for example between 11° and 13°, this angle, as is evident, being measured with respect to a vertical plane.

In order to permit the fetlock part 16 to fit closely around the fetlocks 2 of the animal, particularly with regard to the fastening means to be described below, a plurality of measures are envisaged. On the one hand, the lower wall thickness for at least one wall section 17 or 18 is greater (corresponding to the dimension b—b) than the upper wall thickness b'—b', so that the particular wall 17 or 18 tapers upward in the form of a wedge.

Although the wedge shape is particularly preferred, the design may be such that the hoof part 11 has a thicker wall than the fetlock section 16, both walls having essentially uniform thicknesses, apart from a relatively broad transition section, which is wedge-shaped. Thus, the wedge shape is advantageous, at least over part of the height of the particular wall 17 or 18, a wedge shape over the entire length also having advantages in production, in terms of removal from the mold.

Another measure which permits adaption to various circumferences of the fetlock 2 (FIG. 1) comprises providing at least one slot 19 which extends along the height of the fetlock section 16 and is preferably approximately V-shaped, advantageously having a rounded bottom to the V. The angle between the two limbs of the V is preferably between 10° and 20°, in particular approximately 15°. These dimensions make it possible to manage with few standard sizes, and adjustment can be effected merely with the aid of a fastening means in the form of a tensioning means, without troublesome folds being formed.

Figure 2:
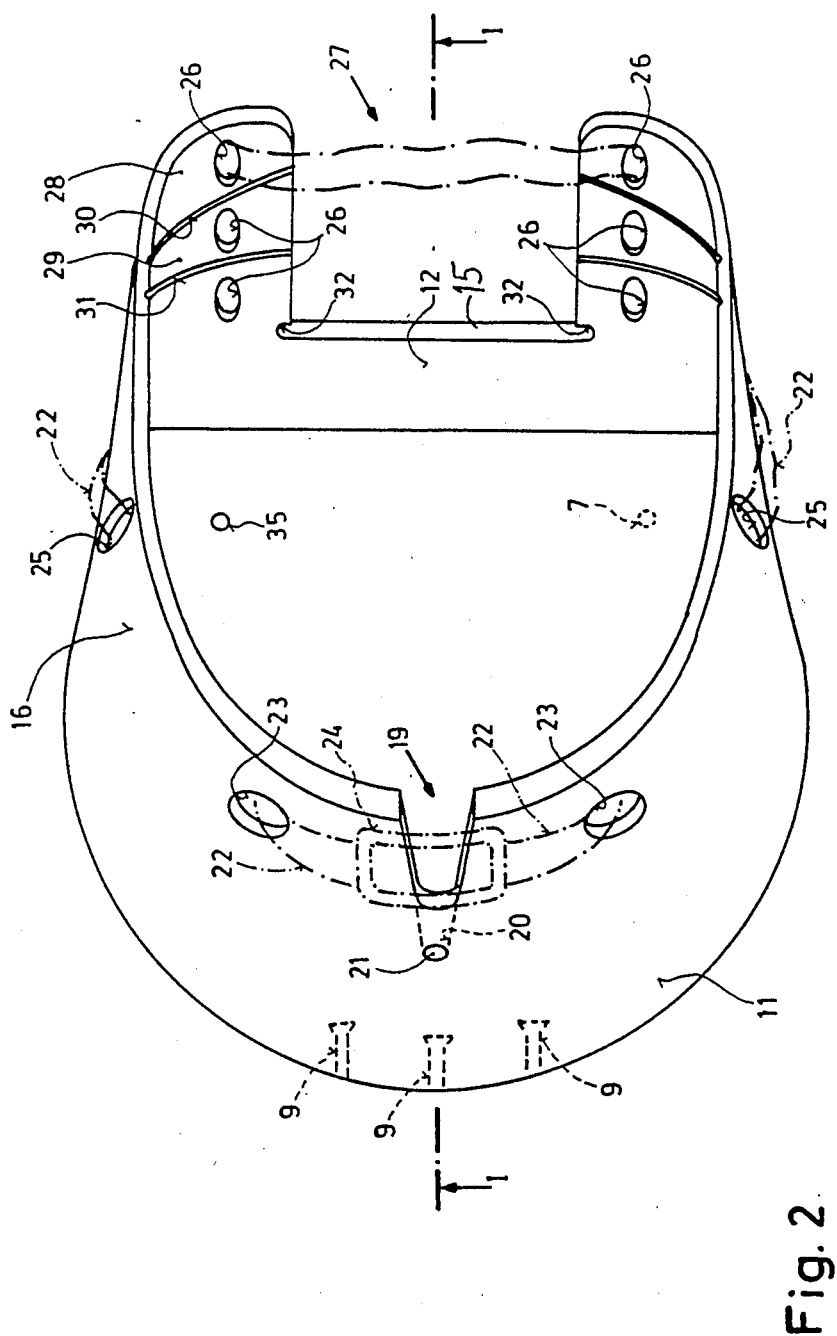

In this case too, it is desirable to be able to make an adjustment to various heights of the hoof 1 (FIG. 1). For this purpose, the slot 19 can be extended, and this can be achieved by means of an appropriate cut line 20 (FIG. 2, 4). It is advantageous to provide at least one cut end in the form of a hole 21. The cut end, forming a termination if the indented line is cut, is of particular importance because a simple non-terminating incision may readily result in tearing even under slight stresses, for example during fitting, so that the footwear 4 would become useless. It is of course also possible for a plurality of holes 21 to be provided one underneath the other, and the design may be such that these holes then possess different dimensions, for exmaple by virtue of the fact that the lower hole in each case has a larger diameter than the hole above it.

The reason why a tensioning means, such as a band or belt, is particularly preferred for fastening has already been mentioned above. However, other fastening means may also be used, as are disclosed, on the one hand, in the direct prior art relating to hoof coverings, as well as in the further prior art, namely that which relates in any way at all to the footwear. Such a tensioning means in the form of a flat tensioning means or of a band 22 is indicated by a dot-dash line in FIG. 1 and 2. It is pulled out at the front trough two lateral openings 23 and can be fastened in a manner known per se with the aid of a buckle 24 or the like. In accordance with the preferred embodiment of the tensioning means 22 in the form of a flat band, the openings 23 are elongated or slot-shaped.

The belt 22 may then extend inward at the sides of the foot covering 4, as shown in FIG. 1. The band 22 then emerges to the outside again via an elongated, slot-like opening 25 of relatively great axial length, and is then fed, in the manner shown in FIG. 2, through one of three openings 26 arranged one on top of the other.

These three (or at least two) openings 26 in turn serve for adaptation to various sizes. The principal reason why the footwear to date did not become established in practice is eliminated by virtue of the fact that fastening is now effected with the aid of the band 22 in a region on the fetlocks 2 which is remote from the sensitive parts 3. For adjustment to different hoof heights, at least two rows of openings 23, 25, 26 could be provided all round, one underneath the other. However, this would have several consequences. On the one hand, the material would as a result be weakened to a greater extent than is the case of the embodiment illustrated. The consequence may well be that it would be necessary to choose thicker material, which would have an adverse effect on the flexibility. On the other hand, additional core pullers would be required in the molding process, which would increase the production costs.

Thus, in order to manage in each case with only a single opening 23 or 25 but nevertheless to feed the band 22, without a bend, to one of the three openings 26, depending on the hoof size, the opening 25 in front of the said openings 26 is in the form of an elongated slot opening whose dimensions are defined by a path of the band 22 from the opening 23 to the uppermost or lowermost opening 26, the said band being at least approximately stretched. These two extreme positions of the band 22 are indicated in FIG. 1 as dot-dash position 22' and as dot-dash position 22''. The placement of the band 22 in relation to the upper edge 15 of the rear wall 12 is best seen in FIG. 1, where a dimension line S illustrates the spacing between the lower edge 22a of the lowermost strap position 22'. This spacing S ensures that the sensitive rudimentary toes 3 are not irritated.

If the band 22 is pulled not through the uppermost opening 26 but through the opening 26 underneath or the lowermost opening 26, the part of the rear wall 12 which is located above this and preferably borders a cut-out 27 (cf. FIG. 2, 3) would project simply as flaps and may cause problems. It is therefore advantageous to remove these residual flaps 28 or 29. In order to facilitate this and also to indicate the optimum cutting direction, indented lines 30, 31 are preferably provided, these lines in the embodiment shown being produced by weakening the material from the inside of the footwear 4.

The cut-out 27 mentioned has a dual function. On the one hand, it is intended—as mentioned—to keep the sensitive part 3 (FIG. 1) of the animal free of pressure as far as possible, while on the other hand the cut-out 27 permits the foot covering to be pulled together without folds, similarly to the slot 19 at the front which lies opposite, and it is therefore clear that, if desired, additional slots similar to the slot 19 may be provided at the sides, although the arrangement shown has proven excellent in practice. A further measure for improving the flexibility of the flaps of the rear wall 12 which remain as a result of the cut-out 27 comprises providing incisions 32 (FIG. 2, 3) which run approximately parallel to the sole area 5.

A large number of modifications are possible within the scope of the invention; thus, it has already been mentioned that the inside of the footwear 4, for example above the openings 23 and 25 and/or underneath may be cushioned if desired. Similar cushioning, for example made of foam, can be provided on the inside of the band 22, in particular at least in the section which may be broadened and which bridges the recess 27. It is also possible for the holding means for the band 22 to be provided not by the openings 23, 25 and 26 but by appropriate hooks or rings mounted on the outside. in a manner similar to that proposed in U.S. Pat. No. 3,732,929, although the embodiment shown is not only simpler to produce but also more reliable. The openings 23, 25 and 26 can, if desired, also be reinforced, either by means of a thicker edge of material or by means of metal rings pinched in.

In another possible variant, the indentations 7 are utilized not for individual spikes 8 but for the insertion of fastening pins of one covering element or of a plurality of small covering elements, for example covering plates with projecting studs. The sole profile can of course also be of any design.

From the above descriptions of the slot 19 in conjunction with the drawing, it may be evident that the slot 19 preferably extends essentially over the entire length of the fetlock section 16, although a certain tolerance in the downward or upward direction is permissible here. However, the slot 19 should at least extend over part of the length or height of the fetlock section 16. Because it is precisely in these regions of the front wall 17 that the possibility of fitting different anatomical forms is important, it is also particularly advantageous to provide, at least in this region, the difference between the upper and lower wall thicknesses b—b and b'—b' which has been described.

It may be desirable to provide the sole area 5, the hoof-covering part 11 and/or the fetlock section 16 with additional openings, slots or cut-outs in order to promote breathing of the skin, particularly in the fetlock region, so that, in the end, these parts or sections only partially cover the particular body area of the animal. Holes 35, for example, are provided for removing foreign material from the space between the sole area 5 and hoof. Depressions 34 can hold cushions, medicaments or the like.

Figure 5:
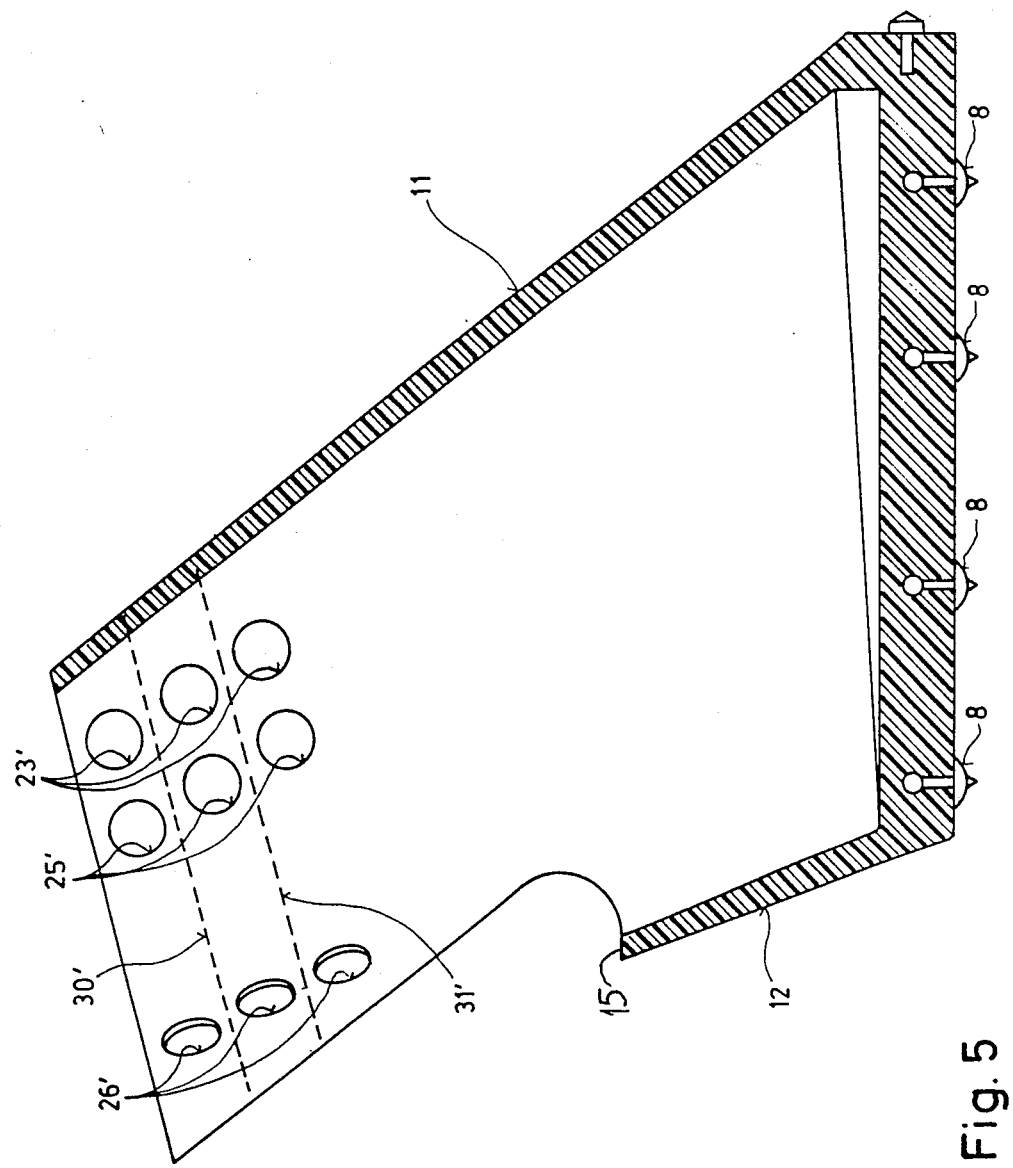

FIG. 5 shows another embodiment of the invention in a section similar to FIG. 1, except that the front and middle holding openings, designated by 23' and 25' in this case, are each present in triplicate, in line with the rear holding openings 26'. Nominal cutting lines 30' and 31' are located underneath the upper and lower rows of holding openings 23', 25', 26' and serve to shorten the footwear for medium or low hoofs or fetlock sections of corresponding animal feet.

I claim:

1. Footwear for hoofed animals, comprising a cup-like, closed, resilient unit (4) having a sole (5) and a hoof-covering part (11)
    said hoof-covering part starting from below a front edge and the two side edges of the sole (5), said hoof-covering part being extended upward by means of a fetlock section (16) which substantially covers the fetlocks (2) of the animal; and
    a fastening means (22) carried by the fetlock section, wherein a rear wall (12) of the hoof-covering part (12) starting from the rear edge of the sole (5) has its upper edge (15) below the region of the rudimentary toes (3) of the animal, and the fastening means (22) at the rear of the animal's foot engages the hollow of the heel (33) and above the rudimentary toes (3) of the animal, and defining a space (S) between said upper edge (15) of the rear wall (12) and a lower edge (22a) of the fastening means.

2. Footwear as claimed in claim 1, wherein at least the rear wall (12) of the hoof-covering part has at least one indented line (13) defining removable sections for lowering the height of at least the rear wall of said hoof-covering part.

3. Footwear as claimed in claim 2, wherein the rear wall (12) makes an angle (beta) of more than 90°, preferably more than 100°, in particular about 110°, with the sole (5).

4. Footwear as claimed in claim 1, wherein the fetlock section (16) is formed with at least one slot (19) which extends over at least part of its length and is arranged at the front thereof.

5. Footwear as claimed in claim 4, wherein at least one additional removable section of said hoof-covering part is defined by additional indented lines located beneath the at least one slot (19), in order to lengthen the latter if required, and is advantageously terminated by termination means (21) at the bottom of said at least one additional removable section.

6. Footwear as claimed in claim 1, further comprising at least two holding means (26) positioned on the fetlock section for holding the fastening means,
    said at least two holding means being located one underneath the other for optionally mounting the fastening means (22) at various heights; and
    at least one indented line (30,31) being located between the holding means (26), in side wall portions of the fetlock section, and passing between the holding means (26) through to the upper edge of the fetlock section (16).

7. Footwear as claimed in claim 6, wherein the holding means includes
    a slot opening (25) formed at a forward region of the fetlock section,
    and a plurality of holes (26) at rearward regions of the fetlock section; and
    the fastening means includes tensioning means (22) fed to the front through an opening (23) in the upper and front region of the fetlock section (16) and passed to openings (26) lying one underneath the other.

8. Footwear as claimed in claim 1, wherein the sole (5) has at least one vertical indentation (7) for holding a reinforcement.

9. Footwear as claimed in claim 1, wherein the inner surface of the sole is formed with depressions (34) for holding cushions, medicaments or the like.

10. Footwear as claimed in claim 1, wherein holes (35) are formed in the sole (5) for removing solid or liquid foreign bodies.

11. Footwear as claimed in claim 1, wherein the sole (5) has at least one horizontal indentation (9) arranged at the front edge of the footwear, for holding a reinforcement.

12. Footwear for a hoofed animal for covering and protecting the hoof comprsing:
    a unitary element including
    a sole portion (5);
    an upstanding portion (11) extending upwardly from the sole portion along the entire circumference thereof, for surrounding and enclosing the hoof of the animal,
    said upstanding portion having a bottom part (11) secured to the sole portion (5) and essentially surrounding the hoof of the animal,
    said bottom part defining a forward region extending over the forward potion of the hoof, sidewall regions and a rear-wall region (12),
    said upstanding portion having an upper part (16) extending upwardly from the forward region and the sidewall regions of the bottom part and substantially covering the forward regions and sides of the fetlocks of the animal, said upper part merging smoothly with said bottom part;
    wherein the rear-wall region (12) of said bottom part terminates in an upper edge (15) located below the region of the rudimentary toes (3) of the animal, and covering essentially only the hoof of the animal below the rudimentary toes; and
    further comprising fastening means (22) secured to the upper-part (16) of the upstanding portion and along the sidewall regions and engageable with the rear of the animal's foot in the hollow of the heel (33) of the animal and above said rudimentary toes (3) of the animal and defining a space (S) between said upper edge (15) of the rear wall region (12) and a lower edge (22a) of the fastening means.

13. The footwear of claim 12, wherein said rear-wall (12) is formed with at least one indented line (13) extending essentially parallel to said upper edge (15), said at least one line terminating in pre-formed termination means (14) for defining removable sections to lower the height of at least the rear-wall of said upstanding bottom part (11).

14. The footwear of claim 12, wherein the forward region of the upper part (16) of the upstanding portion is formed with at least one elongated slot (19) extending from an upper edge thereof towards the sole portion (5).

15. The footwear of claim 14, wherein said upstanding portion is formed with at least one additional indented line (20) extending essentially as a prolongation and in the direction of said at least one slot (19) and terminating in a pre-formed termination means (21) for selectively lengthening the opening defined by said at least one slot.

16. The footwear of claim 12, further including indented lines (30, 31) located on said sidewall regions of the upper-part (16) of the upstanding portion and extending in a direction from the forward region to a rearward zone thereof, to form removal lines for selectively removing sectional elements of the sidewall regions and thus changing the height of the sidewall regions.

17. The footwear of claim 12, further including securing means (23, 25, 26) associated with at leat one of: the forward region; the sidewall regions, for securing the fastening means (22) to the respective regions of the upper-parts (16) of the upstanding portion.

18. The footwear of claim 17, wherein said securing means includes
a plurality of holes (26) formed in the upper-part (16) of the upstanding portion located above each other, at least one hole (23) being formed in the forward region of the upper-part of the upstanding portion, and a plurality of holes (25,26) are formed in the sidewall regions, at least some of said plurality of holes (26) being arranged in a column of holes above each other for selective placement of the fastening means (22,22',22") therethrough in accordance with the anatomy of the animal.

19. The footwear of claim 18, wherein at least one other hole (25) is located adjacent said column of holes; and
wherein said fastening means (22) comprises a band element (22) selectively positionable in said holes.

20. The footwear of claim 19, further including indented lines (30,31) located on said sidewall region of the upper-part of the upstanding portion and extending in a direction from the forward region to the rear wall zone thereof, said indented lines passing between said holes (26) of the column,
to form removal lines for selectively removing sectional elements of the sidewall regions and thus changing the height of the sidewall regions to permit matching said unitary element to the anatomy of the animal.

21. The footwear of claim 12, wherein said unitary element comprises a cup-like plastic molding (4).

* * * * *